United States Patent
Ali et al.

(10) Patent No.: US 11,390,792 B2
(45) Date of Patent: Jul. 19, 2022

(54) CLAY-FREE DRILLING FLUID COMPOSITION

(71) Applicant: OREN HYDROCARBONS LLC, Sugar Land, TX (US)

(72) Inventors: Mahaboob Subhahani Mohamed Ali, Chennai (IN); Mohamed Iqbal Batcha Imam Jafar Khan, Chennai (IN); Arivudainambi Udaiyar Shanmugavel Ezhil, Chennai (IN); Senthilkumar Sudararaj, Chennai (IN); Rizwan Ahmad, Chennai (IN)

(73) Assignee: OREN HYDROCARBONS LLC, Sugar Land, TX (US)

( * ) Notice: Subject to any disclaimer, the term of this patent is extended or adjusted under 35 U.S.C. 154(b) by 0 days.

(21) Appl. No.: 16/764,657

(22) PCT Filed: Nov. 16, 2018

(86) PCT No.: PCT/US2018/061559
§ 371 (c)(1),
(2) Date: May 15, 2020

(87) PCT Pub. No.: WO2019/099858
PCT Pub. Date: May 23, 2019

(65) Prior Publication Data
US 2020/0283674 A1    Sep. 10, 2020

Related U.S. Application Data

(60) Provisional application No. 62/678,106, filed on May 30, 2018, provisional application No. 62/587,801, filed on Nov. 17, 2017.

(51) Int. Cl.
*C09K 8/34* (2006.01)

(52) U.S. Cl.
CPC ..................... *C09K 8/34* (2013.01)

(58) Field of Classification Search
CPC .............. C09K 8/32; C09K 8/34; C09K 8/12
See application file for complete search history.

(56) References Cited

U.S. PATENT DOCUMENTS

| | | | |
|---|---|---|---|
| 4,172,800 A | 10/1979 | Walker | |
| 4,306,980 A * | 12/1981 | Brandt | C09K 8/36 507/103 |
| 2005/0049147 A1 | 3/2005 | Patel et al. | |
| 2011/0214864 A1* | 9/2011 | Maghrabi | C09K 8/36 166/294 |
| 2013/0303410 A1 | 11/2013 | Wagle et al. | |
| 2014/0121135 A1* | 5/2014 | Gamage | C09K 8/36 507/131 |
| 2017/0275516 A1* | 9/2017 | Ma | C09K 8/035 |

OTHER PUBLICATIONS

Product data sheet, EZ MUL NT, downloaded on Jul. 26, 2021.*
Product data Sheet, VERSAMINE 552, downloaded on Jul. 26, 2021.*
International Search Report and Written Opinion for PCT/18/61559 dated Feb. 1, 2019.

* cited by examiner

*Primary Examiner* — Kumar R Bhushan
(74) *Attorney, Agent, or Firm* — Jones Robb, PLLC

(57) ABSTRACT

A fluid composition including a base fluid; and an additive composition. The additive composition includes an emulsifier; a fluid loss control agent; a rheology modifier; and a viscosifier. The fluid composition is free or substantially free of organophilic clay. The fluid composition may be used as a drilling composition.

20 Claims, No Drawings

CLAY-FREE DRILLING FLUID COMPOSITION

CROSS-REFERENCE TO RELATED APPLICATIONS

This application claims the benefit of priority of U.S. Provisional Patent Application No. 62/587,801 filed Nov. 17, 2017, and U.S. Provisional Patent Application No. 621678,106 filed May 30, 2018. The entire contents of each of the above-referenced disclosures are specifically incorporated herein by reference without disclaimer.

FIELD OF INVENTION

The invention relates to fluid compositions for well completions. In particular, the invention relates to invert fluid compositions. More particularly, the invention relates to clay-free invert fluid compositions,

BACKGROUND

Organophilic clay is a common additive used as a viscosifier in oil-based mud systems for drilling. It is used to provide viscosity to the mud prior to mud equilibration while heat or high shear mixing. However, organophilic clays may not be well suited to a number of drilling fluid applications.

For example, organophilic clay exhibits limited effectiveness in viscosifying muds having base fluids with low aromatic and/or high paraffin oil content. In order to provide viscosifying effects, the organophilic clays are first activated through heating. This heat is typically provided through heaters or through high shear mixing equipment that heats up muds through frictional forces. However, equipment for heating such muds may require high capital (e.g. equipment costs) and/or operational (e.g., time and/or energy) costs.

It may, nevertheless, be desirable to formulate drilling compositions using such base fluids because these base fluids are generally considered safer to aquatic system than conventional base fluids, such as diesel. This is at least partly because diesel encompasses hydrocarbon materials having varied compositions. For example, diesels may have variation in chemical composition (e.g. aromatic and/or aliphatic content) due to the origin and refining processes used. Diesels marketed as fuel often include additives such as corrosion inhibitors and/or surfactants. The effects of the varied compositions and the additives on the performance of mud systems with organophilic clays may be difficult to predict. Additive-free diesels for drilling are not readily available. Further, base fluids having low aromatic content is generally considered more environmentally friendly because aromatic compounds may be relatively biosorbable.

Further, organophilic clays are derived from clays that are treated to provide organophilic properties, such as to make them oil-dispersible. The treatment can include contacting the clays with an oil-wetting agent such as organocations like quaternary alkylammonium compounds. However, when drilling compositions comprising organophilic clays are used in aquatic systems, salts of these quaternary alkylammonium compounds may be leached from the clays. These salts may be toxic to aquatic organisms.

Further still, the heat and shear from mixing when preparing invert oil-based drilling compositions with organophilic clays must be carefully controlled. If not carefully controlled, an excess of organophilic clays may be added in order to achieve the desired viscosity. Similarly, drilling compositions with organophilic clays tend to exhibit thermal thinning and thermal degradation. These can lead to undesirable drilling fluid viscosities when used in high temperature and high pressure (HTHP) conditions. For example, fluid compositions with organophilic clays may exhibit a sharp drop in viscosity at high temperatures, such as above 350° C.

Further yet, organophilic clays may not provide sufficient viscosity to remedy against barite sag. This may lead to mud weight gradients, stuck pipe, wellbore instability, lost circulation, differential sticking and well control difficulties.

There is a need for improved fluid compositions.

SUMMARY

In an aspect, there is provided a fluid composition comprising: a base fluid; and an additive composition comprising: an emulsifier; a fluid loss control agent; a rheology modifier; and a viscosifier: wherein the fluid composition is free or substantially free of organophilic clay.

In some embodiments, the base fluid is an oleic material. In some embodiments, the oleic material is a synthetic oil or semi-synthetic oil. In some embodiments, the oleic material comprises a paraffin material, an olefinic material, an ester material, a petroleum distillate, a polycyclic aromatic hydrocarbon material, or a combination thereof.

In some embodiments, the emulsifier comprises a dicarboxylic acid terminated polyimide.

In some embodiments, the viscosifier comprises a saturated fatty acid derivative.

In some embodiments, the fluid loss control agent comprises a modified fatty acid.

In some embodiments, the modified fatty acid is a fatty acid anhydride.

In some embodiments, the rheology modifier includes a dicarboxylic acid.

In some embodiments, the fluid composition comprises an aqueous phase. In some embodiments, the aqueous phase comprises sodium chloride, calcium chloride, or a combination thereof.

In some embodiments, the fluid composition comprises a pH modifier, a weighting agent, or a combination thereof.

In some embodiments, the yield point to plastic viscosity ratio is less than about 0.5.

In some embodiments, the fluid composition comprises: from about 400 L to about 800 L of the base fluid per cubic meter of the fluid composition; from about 24 to about 45 L of the emulsifier per cubic meter of the fluid composition; from about 8 to about 26 kg of the viscosifier per cubic meter of the fluid composition; from about 3 L to about 15 L of the rheology modifier per cubic meter of the fluid composition; from about 50 to about 300 L of water per cubic meter of the fluid composition; and from 0 to about 30 wt % of a salt based on the weight of the water.

In some embodiments, the fluid composition further comprises from about 300 to about 1400 kg of barite per cubic meter of the fluid composition. In some embodiments, the fluid composition further comprises from about 10 to about 30 kg of lime per cubic meter of the fluid composition.

In some embodiments, one or more of components of the additive composition forms a gel.

In an aspect, there is provided a use of the fluid composition in a drilling operation, In an aspect, there is provided a method for drilling a wellbore using the fluid composition.

In an aspect, there is provided a method for reducing organophilic clay during drilling using the fluid composition.

In an aspect, there is provided a process for preparing a fluid composition. The process includes supplying a base fluid to a mixing zone, supplying an emulsifier to the mixing zone, supplying water to the mixing zone, supplying a viscosifier to the mixing zone, supplying a rheology modifier to the mixing zone, and supplying a fluid loss control agent to the mixing zone.

In some embodiments, after the supply of each ingredient, the mixture is mixed for a respective predetermined period.

DETAILED DESCRIPTION

While the present invention may be embodied in many different forms, the present disclosure provides specific illustrative embodiments that exemplify the principles of the invention. The present invention is not limited to the specific embodiments illustrated.

As used herein a "material" can be a compound, element, or a mixture of compounds and/or elements of that material type. For example, a paraffinic material may include one or more different paraffin molecules, such as paraffins having different chain lengths.

In an aspect, there is provided a fluid composition. In some embodiments, the fluid composition is for drilling, casing and/or cementing a wellbore. In some embodiments, the fluid composition is a drilling fluid composition.

In some embodiments, the fluid composition includes a base fluid; an additive composition. The additive composition includes an emulsifier, a fluid loss control agent, a rheology modifier, and a viscosifier.

In some embodiments, the fluid composition includes from about 400 L to about 800 L of the base fluid per cubic meter of the fluid composition. In some embodiments, the fluid composition includes from about 24 to about 45 L of the emulsifier per cubic meter of the fluid composition. In some embodiments, the fluid composition includes from about 8 to about 26 kg of the viscosifier per cubic meter of the fluid composition. In some embodiments, the fluid composition includes from about 3 L to about 15 L of the rheology modifier per cubic meter of the fluid composition. In some embodiments, the fluid composition includes from about 8 L to about 26 L of the fluid loss control agent per cubic meter of the fluid composition.

In some embodiments, the additive composition improves at least one of the rheological and filtration control, well bore stability, bit performance, fluid stability, temperature stability and environmental acceptability of the fluid composition. In some embodiments, at least one of the additives of the additive composition improves at least one of the properties. For example, in some embodiments, the emulsifier improves well bore stability, bit performance, and/or stability of the drilling system. In some embodiments, the viscosifier improves rheological properties, temperature stability and/or environmental acceptability. In some embodiments, the theology modifier improves rheological properties. In some embodiments, the fluid loss control agent improves filtration control.

In some embodiments, the base fluid includes an oleic material, such as an oil. In some embodiments, the oil includes a naturally occurring oil, a synthetic oil, a semi-synthetic oil, or a combination thereof. In some embodiments, the oil is a synthetic oil. Synthetic oils may be preferred because their composition are generally more uniform. For example, such oils may contain one type of compound with fairly narrow molecular weight distribution. In some embodiments, the synthetic base fluids include synthetic hydrocarbons, ethers, esters and acetals. In some embodiments, the synthetic hydrocarbons include molecules having only hydrogen and oxygen atoms. In some embodiments, the synthetic hydrocarbons include olefins having formula $C_nH_{2n}$. In some embodiments, the base fluid includes a high ester content. Base fluids with high ester content may be preferred because esters are generally considered biodegradable. In some embodiments, the base fluid is selected based on cost, local availability, and environmental factors.

In some embodiments, the base fluid includes a paraffinic material, an olefinic material, an ester material, or a combination thereof. In some embodiments, the olefinic material includes an isomerized olefin. In some embodiments, the base fluid includes from about 50 wt % to about 99 wt % of the ester material, from 0 wt % to about 50 wt % of the paraffinic material, and from 0 wt % to about 50 wt % of the olefinic material.

In some embodiments, the base fluid includes a petroleum distillate. In some embodiments, the petroleum distillate includes a hydrocarbon material having a boiling range of from about 205° C. to about 345° C., and/or carbon numbers in the range of C11 to C20. In some embodiments, the petroleum distillate is a straight-run middle having CAS Number 64741-44-2. In some embodiments, the petroleum distillate has low toxicity and/or good biodegradability (such as aerobic and/or anaerobic biodegradability). In some embodiments, the petroleum distillate has a high flash point, such as above 110° C.

In some embodiments, the base oil includes a polycyclic aromatic hydrocarbon material. In some embodiments, the In some embodiments, the polycyclic aromatic hydrocarbon material has CAS Number 130498-29-2.

In some embodiments, the emulsifier includes a polyamide. In some embodiments, the polyamide is a dicarboxylic acid terminated polyamide. In some embodiments, the emulsifier has a structure as set out in formula I:

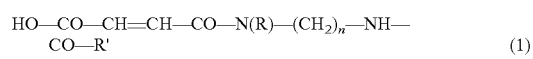

HO—CO—CH=CH—CO—N(R)—(CH$_2$)$_n$—NH—CO—R'      (1)

where:
R is a C12-C18 alkyl;
R' is a C12-C18 alkyl and;
n is an integer from 2 to 5.

In some embodiments, the emulsifier has a hydrophilic-lipophilic balance (HLB) of from about 11 to about 16. In some embodiments, the emulsifier is EIMSTABER™ from Oren Hydrocarbons. The emulsifier has a hydrophobic portion and a hydrophilic portion. The hydrophobic portion is generally soluble in oil (e.g. the base fluid) and may attract particulate matter while the hydrophilic portion is attracted to water. In some embodiments, the particulate matter includes an oil-wetting surface. In some embodiments where the emulsifier is a dicarboxylic acid terminated polyamide, the emulsifier includes a polyamide moiety providing solubility in the base oil and a hydrophilic acid moiety that emulsifies water in oil. The interactions between the emulsifier, oil, water, and particulate matter tends to stabilize the water-oil-particulate matter system. In some embodiments, the particulate matter gets contained in the emulsified phase, getting oil-wetted by the emulsifier. The emulsifier tends to decrease the accumulation of water in filtrate produced during a drilling operation since the water is emulsified as part of the aqueous phase. In some embodiments, the emulsifier exhibits good stability at temperatures at least 200° C.

In some embodiments, the viscosifier is a saturated fatty acid derivate. In some embodiments, the viscosifier has a structure as set out by formula II:

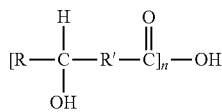

where:
R is a C12-C18 alkyl;
R' is a C12-C18 alkyl; and
n is an integer of from 2 to 5.

In some embodiments, the viscosifier is adsorbed at oil/water interfaces with a non-polar moiety oriented towards to oil phase and a polar group in the aqueous phase. In some embodiments, the emulsifier is VISBUILDER™ from Oren Hydrocarbons, In some embodiments, the viscosifier enhances low shear rheological properties. Rheological properties may be determined, for example, on a Fann 35 Viscometer. In some embodiments, measurements obtained at rotational speeds of less than about 6 rpm on the Fann 35 Viscometer are used to determine low shear rheological properties. In some rheological properties at 6 rpm and 3 rpm are approximately equal when taken under atmospheric pressure at 120° F. In some embodiments, low shear rate rheological properties are more important than high shear rate rheological properties when designing drilling fluid compositions. This is because the annular fluid velocity and shear rates encountered during drilling are relatively low in deepwater drilling operations. Although high shear rate may have an effect on stand pipe pressure, the high shear rate viscosity values have relatively low effect on pressure loss in the annulus and the resulting effect on the equivalent circulating density.

In some embodiments, the rheology modifier includes a dicarboxylic acid. In some embodiments, the rheology modifier includes a molecule set forth in formula (iii):

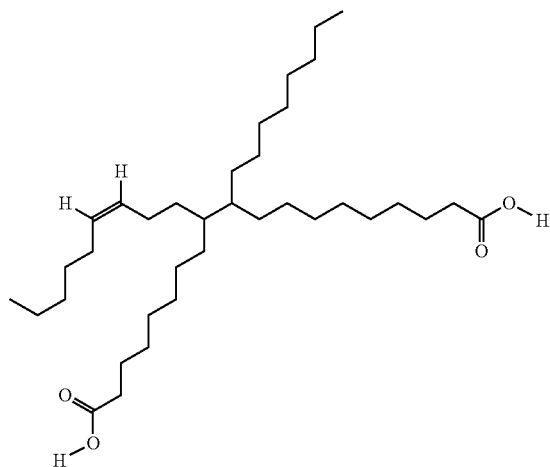

In some embodiments, the rheology modifier is oil soluble and swells in the fluid composition, increasing the volume of the oleic phase. The dicarboxylic acid emulsifies water and oil molecules at the acid moieties, thereby increasing the viscosity of the fluid composition. In some embodiments, the rheology modifier is ULTRAMOD™ from Oren Hydrocarbons. In some embodiments, the rheology modification helps improve the ability to suspend particulate matter. In some embodiments, the rheology modifier increases viscosity at low concentrations.

In some embodiments, the fluid loss control agent is a modified fatty acid. In some embodiments, the fatty acid has a chain length of $C_{16}$-$C_{18}$. In some embodiments, the fatty acid is modified with dicarboxylic acid breaking an olefinic double bond similar to a Diels-Alder reaction. In some embodiments, the modified fatty acid is a fatty acid anhydride. In some embodiments, the modified fatty acid comprises a molecule set forth in formula (iv):

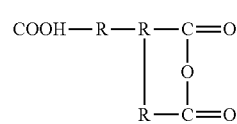

where R is a C12-C15 alkyl.

In some embodiments, the fluid loss control agent is a secondary emulsifier that enhances the emulsification of the water and oil, and/or the wetting a weighting agent. The enhanced emulsification and/or weighting agent wetting may improve electrical stability and/or fluid loss properties. In some embodiments, the fluid loss control agent is FC PLUS™ from Oren Hydrocarbons. During drilling operations, drilling fluid composition may be lost, for example, to the formation. For example, when drilling reaches a zone in the formation with fractures therein, a portion of the drilling fluid composition may enter these fractures, leading to a loss of the drilling fluid composition from the wellbore. This loss is generally undesirable because the drilling fluid composition may need to be replaced, and because it may result in loss of hydrostatic pressures that may lead to "kicks" or even blowouts. In some embodiments, the fluid composition reduces the amount of fluid lost to the formation by up to 30%, 40%, 50%, 60%, 70% or even 80% as compared to conventional invert emulsion fluids. An exemplary test for comparing fluid filtration loss is the HPHT Fluid Loss Test set out in API 13B-RP1.

Over a period of service, oil based mud that is injected into a wellbore will accumulate colloidal cuttings, which are generated during drilling process. In such conditions injected mud may be returned to the surface with undesirably high viscosities and gel points, and may be difficult to pump out for disposal. In some embodiments, the composition includes a thinning agent. In some embodiments, the thinning agent comprises a polycondensed fatty acid material, a surfactant, and a solvent. In some embodiments, the thinning agent is FLUX PLUSH from Oren Hydrocarbons Ltd. In some embodiments, the thinning agent mitigates against the effects of solids in the drilling fluid on the rheological properties. In some embodiments, the thinning agent promotes oil-wetting in barite and/or drilled solids. In some embodiments, the thinning agent is tolerant of clay contaminants. In some embodiments, the thinning agent stabilizes water-in-oil emulsions in different oil based fluids. In some embodiments, the thinning agent tolerates various brines as the internal discontinuous phase. In some embodiments, the thinning agent modifies the relationship between viscosity and solids volume by reducing gel strength and enhances the pumpability of a fluid on the fluids return to the surface.

In some embodiments, the fluid composition is a water-in-oil ("Invert") fluid composition. As such, in some embodiments, the fluid composition includes an aqueous phase. In some embodiments, the fluid composition includes from about 50 to about 300 L of water per cubic meter of the fluid composition. In some embodiments, the oil to water ratio is from about 95:5 to about 55:45 (by volume).

The aqueous phase may provide weight and/or gel properties to the fluid composition that may help to suspend hole cuttings. Further, in some embodiments, the aqueous phase is easily diluted or concentrated. In some embodiments, the aqueous phase does not solidify at high temperatures, and may therefore be effective in deep wildcat wells.

In some embodiments, the aqueous phase is emulsified, such as by the emulsifier, in the fluid composition in droplets. In some embodiments, the droplets have a diameter of less than about one micron. In invert fluid compositions, the base fluid is an oil that forms a continuous phase, while the aqueous phase forms a discontinuous phase. In some embodiments, the oil to water ratio is from about 60:40 to about 95:5 by volume, preferably from about 70:30 to about 90:10 by volume, more preferably about 90:10 by volume.

In some embodiments, the aqueous phase is a brine including water and a salt. In some embodiments, the brine helps reduce hydration, swelling and sloughing of material from the formation into the wellbore. In some embodiments, the brine includes from about 10 to about 350000 parts per million of metal ions in the aqueous phase. In some embodiments, the salt includes calcium chloride, sodium chloride, or a combination thereof. In some embodiments, the salt includes calcium chloride. In some embodiments, the concentration of calcium chloride in the brine is up to about 30 wt % based on the total weight of the brine.

In some embodiments, the fluid composition includes a pH modifier. In some embodiments, the pH modifier includes lime. In some embodiments, the lime reacts with the emulsifier. In some embodiments, the reaction is a saponification reaction whereby an oil soluble soap is formed. For example, the hydroxide ions from dissolved lime react with the emulsifier helps maintain or enhance emulsion stability. Further, free lime may help neutralize influx of acidic gases, such as hydrogen sulphide and carbon dioxide, liberated during drilling.

In some embodiments, the fluid compositions comprise a weighting agent. The weighting agent may increase slurry density, help restrain high formation pressure and/or improve the mud displacement. In some embodiments, the weighting agent is barite. However, barite may separate from the liquid phase and settle (also known as "barite sag"). Barite sag results in variations in density in the wellbore. In some embodiments, the fluid composition exhibits less sag (e.g. "barite sag") as compared to conventional fluid compositions.

In some embodiments, the drilling fluid compositions exhibit gel behavior. In some embodiments, the viscosifier, rheology modifier, or both contribute to gel behavior. For example, the viscosifier, rheology modifier, or both may form cross-links and/or provide structure for the gel. In some embodiments, the gel tends to increase the viscosity of the fluid composition and to entrain solid particulate matter, such as the barite, drill cuttings or other particulate matter, in the fluid composition. A gel strength that is too low may result in barite sag. In contrast, a high gel strength may require high pressures during drilling operations to break the fluid composition, which may result in lost circulation and or other inefficiencies. The gel strength may vary with temperature and/or pressure. In some embodiments, the fluid composition has a low gel strength that balances reducing the energy required to break the fluid composition with reducing barite sag. In some embodiments, the solid particular matter entrained by the fluid composition has a size of at least about 75 microns. Gel strength can be estimated using equation (v):

$$P_{gsds}=(L_{ds})(T_{gs})/300D_i) \qquad (v)$$

where:
$P_{gsds}$ is the pressure required to break the gel strength inside the drill string in psi;
$T_{gs}$ is the 10 min gel strength of drilling fluid in lb/100 ft$^2$
$D_i$ is the inside diameter of drill pipe in inches
$L_{ds}$ is the length of drill string in ft.

In some embodiments, the fluid composition has a relatively low plastic viscosity (PV). PV is a viscosity caused by solids present in the fluid composition. The omission of the organophilic clay from the fluid composition may reduce the PV. A low PV suggests a lower viscosity caused by solids and that the mud density would be equally distributed. Drilling using fluid compositions with high PV may have increased solids therein, slowing the rate of penetration (ROP). Further, a lower PV results in lower equivalent circulating densities (ECD). Lower PVs may help improve hole cleaning during drilling and workovers. In some embodiments, the fluid composition has a plastic viscosity (PV) of up to about 70 cP, preferably from about 15 to about 65 cP at 49° C. and atmospheric pressure, After high temperature aging, such as by hot rolling, the PV By lowering lower yield point of a drilling composition, the energy requirements for drilling operations may also be lowered since lower stresses are required for the mud to flow and/or behave plastically. However, at yield points that are too low, barite sagging may be observed. In some embodiments, the fluid composition has a yield point (YP) of from about 5 to about 30 lb*s/100 ft$^2$. In some embodiments, the fluid composition, after hot rolling, has a YP of from about 10 to about 35 lb*s/100 ft$^2$. The drilling fluid generally exhibits a plastic behavior until the shear stress exceeds the yield point. In some embodiments, the fluid composition is stable over a wide range of temperatures, including at high temperatures in some embodiments, the VP is stable at a temperature of from about 49° C. to about 120° C. In some embodiments, the rheological properties are stable after hot rolling. In some embodiments, the VP changes by less than about 150%, 100%, 90%, 80%, 70%, 60%, 50%, 40%, 30%, 20% or even 10%.

In some embodiments, the fluid composition has a YP:PV ratio of less than about 0.5. Fluid compositions having such YP:PV ratios provide a good balance between reduced energy requirements for initiating drilling operations with reduced barite sag.

In drilling operations, the down hole temperature may be high. In some embodiments, the rheological properties of the fluid composition are less sensitive to temperature effects than with a conventional drilling fluid containing organophilic clays. In some embodiments, the fluid composition has a YP:PV ratio of less than about 0.5, a low gel strength without exhibiting barite sag, or both, at temperatures of at least about 50° C., 100° C., 150° C., or 200° C.

In some embodiments, the fluid composition has a relatively stable rheological properties across a wide temperature range and/or after high temperature aging. In some embodiments, the YP:PV ratio is relatively stable before and after high temperature aging, such as by hot rolling.

In some embodiments, the fluid composition is free or substantially free of organophilic clays. Organophilic clays in conventional fluid compositions are suspended particulate matter. Since such conventional fluid compositions comprise suspended particulate matter, the ability of these conventional fluid compositions to tolerate additional particulate matter, for example, introduced from drill cuttings, is reduced. As such, the fluid compositions of the present invention, having lower suspended solids content, is better able to tolerate drill cuttings, rev dust, and/or ball clay contamination while maintaining rheological properties as compared to conventional fluid compositions. In some embodiments, the fluid composition is able to withstand an addition of particulate matter of at least about 100 kg/m$^3$ of the fluid composition. Further, the use of organophilic clays tends to increase the plastic viscosity of the fluid, leading to higher equivalent circulating densities (ECDs). Drilling operations with fluid compositions exhibiting high ECDs requires increased pump pressures. These higher pump pressures may also result in higher loss of the fluid loss to the formation. Further still organophilic clays may exhibit undesirable changes at high temperature, high pressure (HTHP) conditions experienced during drilling operations. For example, the clay may become inactivated at high temperatures, resulting in accumulation downhole and/or requiring the addition of supplemental clay to compensate. This can further increase the ECD. In some embodiments, the fluid composition exhibits low equivalent circulating densities (ECDs) as compared to conventional fluid compositions comprising organophilic clay.

In some embodiments, the drilling fluid composition provides good tolerance to contaminants such as solids and water influx. In some embodiments, the concentrations of the emulsifier, viscosifier and rheology modifier may be adjusted such that adscititious water may be emulsified by the emulsifier and adscititious solids may be suspended in the fluid composition by the viscosifier and rheology modifier without affecting mud stability and rheology.

In some embodiments, the drilling fluid compositions meet environmental regulations for off shore & on shore oil drilling. For example, the US EPA has published the "Development Document for Final Effluent Limitations Guidelines and Standards for Synthetic-Based Drilling Fluids and other Non-Aqueous Drilling Fluids in the Oil and Gas Extraction Point Source Category", EPA-821-B-00-13, with guidelines and standards that drilling fluids should meet.

In some embodiments, the fluid composition provides good wellbore stability. For example, during drilling operations using the fluid composition, a low permeability filter cake is formed from the movement of particles in the drilling composition toward porous zones in the formation due to differential pressure between hydrostatic pressure and formation pressures. This cake tends to seal the wellbore and restricts the flow of fluid from the fluid composition into the formation. Preferably, the filter cake is impermeable and thin. This may reduce loss of the fluid composition to the formation, reduce the likelihood of stuck pipe situations, and/or reduce torque/drag on the drill string. Wellbore stability characteristics may be determined, for example, by HTHP fluid loss studies. In some embodiments, the fluid composition has low HTHP fluid loss values. In some embodiments, the HTHP fluid loss value is less than about 3 mL @ 93° C. In some embodiments, the filter cake has a thickness of less than about 1/16".

In some embodiments, the fluid composition may exhibit an increased rate of penetration as compared to conventional drilling fluids including organophilic clay. This is at least partly due to the effects of increased PV in conventional drilling fluids due to clay addition. Without wishing to be bound by theory, it is believed that the combination of the rheology modifier and fluid loss control agent is able to reduce friction in the wellbore, thereby enabling increased rates of penetration.

In an aspect, there is provided a process for preparing a fluid composition. The process includes supplying a base fluid, adding an emulsifier to the base fluid, adding water, adding a viscosifier, adding a rheology modifier, and adding a fluid loss control agent.

In some embodiments, lime is added, for example, after the addition of the emulsifier. In some embodiments, a salt is added, for example, after the addition of water. In some embodiments, barite is added to the fluid composition, for example, after the addition of the fluid loss control agent.

In some embodiments, the addition of all ingredients occur in a mixing zone. In some embodiments, the mixing zone includes or is contained in a mixer. In some embodiments, the mixer includes mixing blades rotating at a rate of about 11,000 rpm.

In some embodiments, the water and the calcium chloride are added simultaneously. In some embodiments the water and the calcium chloride are mixed together prior to their addition.

In some embodiments, after each addition, the mixture is mixed for a respective predetermined period. This may allow for their even distribution throughout the fluid composition. For example, additional time may be required to emulsify the oil and water, and for the viscosifier to suspend the weighting material as well as to oil wet the weighting material.

In an aspect, there is provided a use of the fluid composition in a drilling operation.

In an aspect, there is provided a method for drilling a wellbore using the fluid composition In an aspect, there is provided a method for reducing organophilic clay during drilling using the fluid composition.

Unless defined in this application, scientific and technical terms used in connection with the present invention shall have the meanings that are commonly understood by those of ordinary skill in the art. Further, unless otherwise required by context, singular terms shall include pluralities and plural terms shall include the singular. For example, the singular forms "a," "an" and "the" include plural referents unless the context dictates otherwise. Thus, for example, reference to "an oil" includes a plurality of oil molecules, reference to "a salt" includes a plurality of salt molecules, and the like. In addition, ranges provided in the specification and appended claims include both end points and all points between the end points. Therefore, a range of 2.0 to 3.0 includes 2.0, 3.0, and all points between 2.0 and 3.0. The term about, when used herein The complete disclosure of all patents, patent applications, and publications, and electronically available material cited herein are incorporated by reference. The description and exemplary embodiments are provided for clarity of understanding only and is not intended to be limiting. No unnecessary limitations are to be understood therefrom. The invention is not limited to the exact details shown and described. Variations obvious to skilled persons are Included within the scope of the invention.

EXAMPLES

Example 1—Effect of Base Fluid

Sample compositions were prepared as follows. Canadian petroleum distillate having trade name as D822/Cutter D was provided. To the Canadian petroleum distillate D822/Cutter D, the following components were added and mixed as follows: 1) EMSTABER™ from Oren Hydrocarbons, followed by mixing 3 minutes; 2) lime (Ca(OH)$_2$), followed by mixing for 3 minutes; 3) water and calcium chloride, followed by mixing for 10 minutes; 4) VISBIALDER™ from Oren Hydrocarbons, followed by mixing for 10 minutes; 5) ULTRAMOD™ from Oren Hydrocarbons, followed by mixing for 3 minutes; 6) FC PLUS™ from Oren Hydrocarbons, followed by mixing for 3 minutes; and 7) barite, followed by mixing for 10 minutes.

The amounts of the various components were varied in each sample composition as set out in Table 1, below.

TABLE 1

| Sample compositions | | | | | |
|---|---|---|---|---|---|
| | | Sample Composition | | | |
| Component | | 1 | 1a | 2 | 2a |
| Base Fluid | (L/m$^3$) | | | | |
| Distillate 822 | | 714 | | 755 | |
| Cutter D | | | 723 | | 761 |
| EMSTABER | (L/m$^3$) | 36 | 36 | 36 | 36 |
| Lime | (kg/m$^3$) | 11 | 11 | 11 | 11 |
| Water | (L/m$^3$) | 80 | 76 | 40 | 40 |
| Calcium Chloride | (kg/m$^3$) | 34 | 32 | 17 | 17 |
| VISBUILDER | (kg/m$^3$) | 17 | 17 | 17 | 17 |
| ULTRAMOD | (L/m$^3$) | 10 | 10 | 10 | 10 |
| FC PLUS | (L/m$^3$) | 10 | 10 | 10 | 10 |
| Barite | (kg/m$^3$) | 462 | 443 | 484 | 462 |
| Mud concentration | (lb$_m$/gal) | 10.5 | 10.5 | 10.5 | 10.5 |
| Oil:Water Ratio | | 90:10 | 90:10 | 95:5 | 95:5 |

The performance characteristics of sample composition 1 and 2 were tested in before (BHR) and after (AHR) hot roll @ 200° F. and provided in table 2, below. The hot rolling simulates the wear of the fluid composition under downhole conditions.

Tests were performed according to procedures set out by the American Petroleum Institute (API) set out in "Recommended Practice for Field Testing Water-based Drilling Fluids" (API 13B-1) and/or "Recommended Practice for Field Testing Oil-Based Drilling Fluids (API 13B-2).

TABLE 2

| Performance characteristics of sample composition 1 and 2 | | | | |
|---|---|---|---|---|
| | Period of Aging = 16 Hours @200° F. | | | |
| | sample composition 1 | | sample composition 2 | |
| RHEOLOGY @ 49° C. | BHR | AHR | BHR | AHR |
| @600 RPM (viscometer dial reading) | 45 | 48 | 37 | 40 |
| @300 RPM (viscometer dial reading) | 26 | 28 | 21 | 22 |
| @200 RPM (viscometer dial reading) | 19 | 20 | 15 | 16 |
| @100 RPM (viscometer dial reading) | 12 | 14 | 9 | 10 |
| @6 RPM (viscometer dial reading) | 5 | 5 | 3 | 4 |
| @3 RPM (viscometer dial reading) | 4 | 4 | 3 | 3 |
| @10" (viscometer dial reading) | 5 | 5 | 4 | 4 |
| @10' (viscometer dial reading) | 6 | 7 | 4 | 4 |
| APPARENT VISCOSITY (cP) | 22.5 | 24 | 18.5 | 20 |
| PLASTIC VISCOSITY (cP) | 19 | 20 | 16 | 18 |
| YIELD POINT (lbs/100 ft$^2$) | 7 | 8 | 5 | 4 |
| YIELD POINT (Pascal) | 3.5 | 8 | 2.5 | 2 |
| Mud Weight (kg/m$^3$) | 10.5 | 10.5 | 10.5 | 10.5 |
| Electrical Stability @ 49° C. | 868 | 831 | 980 | 1082 |
| HTHP FLUID LOSS (mL) (Overall 30 minutes @ 93° C. & 500 Psi differential pressure | | 1.8 | | 1.2 |
| Filter Cake Thickness (mm) | | <1 | | <1 |
| OWR | 90:10 | | 95:5 | |

The performance characteristics of sample composition 1a and 2a were tested in before and after hot roll 200° F. and provided in table 3, below.

TABLE 3

Performance characteristics of sample composition 1a and 2a

Period of Aging = 16 Hours @200° F.

|  | sample composition 1a | | sample composition 2a | |
|---|---|---|---|---|
| RHEOLOGY @ 49° C. | BHR | AHR | BHR | AHR |
| @600 RPM (viscometer dial reading) | 65 | 64 | 59 | 54 |
| @300 RPM (viscometer dial reading) | 36 | 36 | 32 | 28 |
| @200 RPM (viscometer dial reading) | 27 | 26 | 24 | 19 |
| @100 RPM (viscometer dial reading) | 17 | 17 | 14 | 11 |
| @6 RPM (viscometer dial reading) | 7 | 7 | 6 | 4 |
| @3 RPM (viscometer dial reading) | 6 | 6 | 5 | 3 |
| @10" (viscometer dial reading) | 7 | 8 | 7 | 4 |
| @10' (viscometer dial reading) | 13 | 24 | 10 | 16 |
| APPARENT VISCOSITY (cP) | 32.5 | 32 | 29.5 | 27 |
| PLASTIC VISCOSITY (cP) | 29 | 28 | 27 | 26 |
| YIELD POINT (lbs/100 ft$^2$) | 7 | 8 | 5 | 2 |
| YIELD POINT (Pascal) | 3.5 | 4 | 2.5 | 1 |
| Mud Weight (kg/m$^3$) | 10.5 | 10.5 | 10.5 | 10.5 |
| Electrical Stability @ 49° C. | 840 | 801 | 1129 | 1004 |
| HTHP FLUID LOSS (mL) (Overall 30 minutes @ 93° C. & 500 Psi differential pressure |  | 1.4 |  | 1.8 |
| Filter Cake Thickness (mm) |  | <1 |  | <1 |
| OWR | 90:10 | | 95:5 | |

Example 2—Effect of Oil to Water Ratio and Mud Weight

Sample compositions were prepared similar to Example 1 using different Oil Water Ratios (OWR). The OWR represents the fraction of oil base fluid and water in the mud. In general, it is the ratio between the percent of oil in liquid phase and the percentage of water in liquid phase. Oil-based mud systems generally function well with an oil/water ratio in the range from 65/35 to 95/5, but the most commonly observed range is from 70/30 to 90/10. The amounts of the different oil water ratio and mud weight were varied in each sample composition as set out in Table II, below.

The amounts of the various components were varied in each sample composition based on different OWR and mud weight compositions as set out in Table 4, below.

TABLE 4

Sample compositions

|  |  | Sample Composition | | | | | |
|---|---|---|---|---|---|---|---|
| Component | | 1b | 2b | 3b | 4b | 5b | 6b |
| Petroleum Distillate | (L/m$^3$) | 573 | 742 | 518 | 668 | 410 | 524 |
| EMSTABER | (L/m$^3$) | 36 | 36 | 36 | 36 | 36 | 36 |

TABLE 4-continued

Sample compositions

|  |  | Sample Composition | | | | | |
|---|---|---|---|---|---|---|---|
| Component | | 1b | 2b | 3b | 4b | 5b | 6b |
| Lime | (kg/m$^3$) | 11 | 11 | 11 | 11 | 11 | 11 |
| Water | (L/m$^3$) | 247 | 83 | 220 | 74 | 172 | 61 |
| Calcium Chloride | (kg/m$^3$) | 88 | 30 | 79 | 26 | 62 | 22 |
| VISBUILDER | (kg/m$^3$) | 17 | 17 | 17 | 17 | 17 | 17 |
| ULTRAMOD | (L/m$^3$) | 10 | 10 | 10 | 10 | 10 | 10 |
| FC PLUS | (L/m$^3$) | 10 | 10 | 10 | 10 | 10 | 10 |
| Barite | (kg/m$^3$) | 354 | 435 | 611 | 684 | 1304 | 1361 |
| Mud concentration | (lb$_m$/gal) | 10.5 | 10.5 | 12 | 12 | 16.5 | 16.5 |
| Oil:Water Ratio | | 70:30 | 90:10 | 70:30 | 90:10 | 70:30 | 90:10 |

The performance characteristics of sample composition 1b, 2b, 3b, 4b, 5b and 6b were tested in before and after hot roll @ 200° F. and provided in table 5, below.

TABLE 5

Performance characteristics of sample composition 1b, 2b, 3b, 4b, 5b and 6b.
Period of Aging: 16 flours @ 200° F.

|  | Sample Composition | | | | | | | | | | | |
|---|---|---|---|---|---|---|---|---|---|---|---|---|
| RHEOLOGY @ 49° C. | 1b | | 2b | | 3b | | 4b | | 5b | | 6b | |
| viscometer dial reading) | BHR | AHR | BHR | AHR | BHR | AHR | BHR | AHR | BHR | AHR | BHR | AHR |
| @600 RPM | 50 | 64 | 39 | 57 | 76 | 85 | 49 | 64 | 122 | 136 | 98 | 108 |
| @300 RPM | 30 | 42 | 23 | 36 | 48 | 56 | 28 | 40 | 78 | 88 | 59 | 66 |
| @200 RPM | 23 | 36 | 16 | 24 | 32 | 41 | 18 | 29 | 59 | 72 | 44 | 54 |

TABLE 5-continued

Performance characteristics of sample composition 1b, 2b, 3b, 4b, 5b and 6b.
Period of Aging: 16 flours @ 200° F.

| RHEOLOGY @ 49° C. (viscometer dial reading) | Sample Composition | | | | | | | | | | | |
|---|---|---|---|---|---|---|---|---|---|---|---|---|
| | 1b | | 2b | | 3b | | 4b | | 5b | | 6b | |
| | BHR | AHR | BHR | AHR | BHR | AHR | BHR | AHR | BHR | AHR | BHR | AHR |
| @100 RPM | 15 | 29 | 11 | 15 | 22 | 32 | 11 | 17 | 35 | 53 | 30 | 34 |
| @6 RPM | 4 | 14 | 3 | 4 | 6 | 12 | 4 | 6 | 7 | 15 | 6 | 10 |
| @3 RPM | 3 | 10 | 2 | 3 | 5 | 10 | 2 | 5 | 6 | 11 | 5 | 8 |
| @10" | 4 | 12 | 3 | 4 | 7 | 13 | 3 | 7 | 8 | 14 | 6 | 9 |
| @10' | 5 | 15 | 4 | 5 | 9 | 14 | 5 | 9 | 11 | 17 | 7 | 10 |
| APPARENT VISCOSITY (cP) | 25 | 32 | 19.5 | 28.5 | 38 | 42.5 | 24.5 | 32 | 61 | 68 | 49 | 54 |
| PLASTIC VISCOSITY (cP) | 20 | 22 | 16 | 21 | 28 | 29 | 21 | 24 | 44 | 48 | 39 | 42 |
| YIELD POINT (lbs/100 ft$^2$) | 10 | 20 | 7 | 15 | 20 | 27 | 7 | 16 | 34 | 40 | 20 | 21 |
| YIELD POINT (Pascal) | 5 | 10 | 3.5 | 7.5 | 10 | 13.5 | 3.5 | 8 | 16 | 20 | 10 | 10.5 |
| Mud Weight (kg/m$^3$) | 10.5 | 10.5 | 10.5 | 10.5 | 12 | 12 | 12 | 12 | 16.5 | 16.5 | 16.5 | 16.5 |
| 50% Mud pH | 7.28 | 7.38 | 7.33 | 7.46 | 7.34 | 7.32 | 7.38 | 7.37 | 7.42 | 7.45 | 7.39 | 7.43 |
| Electrical Stability @ 49° C. | 594 | 1210 | 702 | 1525 | 892 | 986 | 1186 | 1530 | 787 | 1709 | 912 | 1392 |
| HTHP FLUID LOSS (mL) after 30 minutes @ 93° C. & 500 Psi differential pressure | | 2.0 | | 2.4 | | 1.8 | | 2.2 | | 2.0 | | 2.6 |
| Filter Cake Thickness (mm) | | 0.6 | | 0.4 | | 0.6 | | 0.5 | | 0.9 | | 0.7 |
| OWR | 70:30 | | 90:10 | | 70:30 | | 90:10 | | 70:30 | | 90:10 | |

Example 3—Sample Compositions Comparing Diesel and Poly Alpha Olefin Base Fluids Sample compositions were prepared similar to Example 1 except with diesel as the base fluid. Diesel oil is used in conventional drilling muds as the base fluid. It has been commonly used because of its low cost and availability worldwide. The amounts of the different oil water ratio ranges from 60:40, 70:30 & 90:10 and mud weights 10.5, 12 & 16.5 PPG were prepared in each sample composition as set out in Table 6, below.

TABLE 6

Sample compositions with Diesel as base fluid

| Component | | Sample Composition | | | | | | | | |
|---|---|---|---|---|---|---|---|---|---|---|
| | | 1c | 2c | 3c | 4c | 5c | 6c | 7c | 8c | 9c |
| Diesel | (L/m$^3$) | 479 | 581 | 753 | 442.7 | 526 | 679 | 353 | 418 | 535 |
| EMSTABER | (L/m$^3$) | 36 | 36 | 36 | 36 | 36 | 36 | 36 | 36 | 36 |
| Lime | (kg/m$^3$) | 11 | 11 | 11 | 11 | 11 | 11 | 11 | 11 | 11 |
| Water | (L/m$^3$) | 322.8 | 251 | 84 | 298.8 | 224 | 75 | 234 | 176 | 62 |
| Calcium Chloride | (kg/m$^3$) | 113.2 | 88 | 30 | 104.8 | 79 | 26 | 82.73 | 62 | 22 |
| VISBUILDER | (kg/m$^3$) | 17 | 17 | 17 | 17 | 17 | 17 | 17 | 17 | 17 |
| ULTRAMOD | (L/m$^3$) | 10 | 10 | 10 | 10 | 10 | 10 | 10 | 10 | 10 |
| FC PLUS | (L/m$^3$) | 10 | 10 | 10 | 10 | 10 | 10 | 10 | 10 | 10 |
| Barite | (kg/m$^3$) | 314.8 | 354 | 435 | 582.6 | 611 | 682 | 1286 | 1306 | 1361 |
| Mud concentration | (lb$_m$/gal) | 10.5 | 10.5 | 10.5 | 12 | 12 | 12 | 16.5 | 16.5 | 16.5 |
| Oil:Water Ratio | | 60:40 | 70:30 | 90:10 | 60:40 | 70:30 | 90:10 | 60:40 | 70:30 | 90:10 |

The performance characteristics of sample composition 1c, 2c, 3c, 4c, 5c, 6c, 7c, 8c and 9c were tested in before and after hot roll @ 275° F. and provided in table 7, below.

TABLE 7

Performance characteristics of sample composition 1c, 2c 3c 4c, 5c, 6c, 7c, 8c and 9c.
Period of Aging = 16 Hours @ 275° F.

| RHEOLOGY @ 49° C. (viscometer dial reading) | 1c | | 2c | | 3c | | 4c | | 5c | |
|---|---|---|---|---|---|---|---|---|---|---|
| | BHR | AHR | BHR | AHR | BHR | AHR | BHR | AHR | BHR | AHR |
| @600 RPM | 43 | 84 | 47 | 60 | 38 | 42 | 64 | 82 | 73 | 91 |
| @300 RPM | 27 | 55 | 29 | 37 | 22 | 29 | 39 | 53 | 47 | 62 |
| @200 RPM | 21 | 34 | 21 | 27 | 15 | 19 | 29 | 41 | 38 | 50 |
| @100 RPM | 14 | 22 | 14 | 16 | 11 | 11 | 19 | 35 | 29 | 37 |
| @6 RPM | 4 | 8 | 4 | 5 | 3 | 3 | 5 | 7 | 7 | 12 |
| @3 RPM | 3 | 7 | 3 | 3 | 2 | 2 | 4 | 6 | 6 | 10 |
| @10" | 4 | 8 | 4 | 5 | 3 | 3 | 6 | 8 | 8 | 13 |
| @10' | 5 | 10 | 6 | 7 | 4 | 5 | 7 | 11 | 11 | 14 |
| Apparent Viscosity (cP) | 21.5 | 42 | 23.5 | 30 | 19 | 21 | 32 | 41 | 36.5 | 45.5 |
| Plastic Viscosity (cP) | 16 | 29 | 18 | 23 | 16 | 13 | 25 | 29 | 26 | 29 |
| Yield Point (lbs/100 ft$^2$) | 11 | 26 | 11 | 14 | 6 | 16 | 14 | 24 | 21 | 33 |
| Yield Point (Pascal) | 5.5 | 13 | 5.5 | 7 | 3 | 8 | 7 | 12 | 10.5 | 16.5 |
| Mud Weight (kg/m$^3$) | 10.5 | 10.5 | 10.5 | 10.5 | 10.5 | 10.5 | 12 | 12 | 12 | 12 |
| 50% Mud pH | 7.43 | 7.47 | 7.30 | 7.27 | 7.37 | 7.42 | 7.42 | 7.44 | 7.31 | 7.32 |
| Electrical Stability @ 49° C. | 519 | 674 | 592 | 574 | 925 | 873 | 654 | 780 | 737 | 531 |
| HTHP FLUID LOSS (mL) Overall 30 minutes @ 135° C. & 500 Psi differential pressure | | 2.2 | | 2.6 | | 3.6 | | 1.8 | | 1.8 |
| Filter Cake Thickness (mm) | | <1 | | <1 | | <1 | | <1 | | <1 |
| OWR | 60:40 | | 70:30 | | 90:10 | | 60:40 | | 70:30 | |

| RHEOLOGY @ 49° C. (viscometer dial reading) | 6c | | 7c | | 8c | | 9c | |
|---|---|---|---|---|---|---|---|---|
| | BHR | AHR | BHR | AHR | BHR | AHR | BHR | AHR |
| @600 RPM | 48 | 56 | 126 | 130 | 122 | 126 | 96 | 106 |
| @300 RPM | 27 | 35 | 78 | 81 | 78 | 82 | 59 | 68 |
| @200 RPM | 19 | 22 | 54 | 62 | 54 | 59 | 40 | 46 |
| @100 RPM | 11 | 13 | 23 | 29 | 30 | 32 | 31 | 27 |
| @6 RPM | 5 | 5 | 12 | 15 | 12 | 14 | 12 | 9 |
| @3 RPM | 2 | 4 | 11 | 12 | 10 | 11 | 10 | 7 |
| @10" | 3 | 5 | 12 | 14 | 12 | 12 | 12 | 10 |
| @10' | 5 | 6 | 14 | 18 | 14 | 14 | 14 | 11 |
| Apparent Viscosity (cP) | 24 | 28 | 63 | 65 | 61 | 63 | 48 | 54 |
| Plastic Viscosity (cP) | 21 | 21 | 48 | 49 | 44 | 44 | 37 | 40 |
| Yield Point (lbs/100 ft$^2$) | 6 | 14 | 30 | 32 | 34 | 38 | 22 | 28 |
| Yield Point (Pascal) | 3 | 7 | 15 | 16 | 17 | 19 | 11 | 14 |
| Mud Weight (kg/m$^3$) | 12 | 12 | 16.5 | 16.5 | 16.5 | 16.5 | 16.5 | 16.5 |
| 50% Mud pH | 7.31 | 7.34 | 7.38 | 7.42 | 7.28 | 7.33 | 7.36 | 7.34 |
| Electrical Stability | 1020 | 996 | 907 | 952 | 722 | 579 | 945 | 766 |
| HTHP FLUID LOSS (mL) Overall 30 minutes @ 135° C. & 500 Psi differential pressure | | 2.8 | | 0.4 | | 2.0 | | 2.6 |
| Filter Cake Thickness (mm) | | <1 | | <1 | | <1 | | <1 |
| OWR | 90:10 | | 60:40 | | 70:30 | | 90:10 | | blended ester with linear alpha olefins, poly alpha olefins, internal olefins, and combinations thereof. Olefins and paraffins are often referred to as "synthetics" although they may However, the presence of aromatics may render it toxic to marine aquatic system. In marine environments, for example, low aromatic mineral oils, such as synthetic base fluids, may be preferable to diesel. The base fluid for these synthetic base fluids include normal linear, paraffins, be derived from distillation of crude oil or chemically synthesized from smaller molecules. The sample compositions had an OWR of 70:30 and three different mud weights: 10.5, 12 & 16.5 PPG, as set out in Table 8, below.

TABLE 8

Sample compositions

| Component | | Sample Composition 1d | Sample Composition 2d | Sample Composition 3d |
|---|---|---|---|---|
| PAO | (L/m$^3$) | 577 | 526 | 409 |
| EMSTABER | (L/m$^3$) | 36 | 36 | 36 |
| Lime | (kg/m$^3$) | 8.57 | 11 | 11 |
| Water | (L/m$^3$) | 254 | 219 | 173 |
| Calcium Chloride | (kg/m$^3$) | 91 | 78 | 60 |
| VISBUILDER | (kg/m$^3$) | 17 | 17 | 17 |
| ULTRAMOD | (L/m$^3$) | 10 | 10 | 10 |
| FC PLUS | (L/m$^3$) | 10 | 10 | 10 |
| Barite | (kg/m$^3$) | 393 | 647 | 1343 |
| Mud concentration | (lb$_m$/gal) | 10.5 | 12 | 16.5 |
| Oil:Water Ratio | | 70:30 | 70:30 | 70:30 |

The performance characteristics of sample composition 1d, 2d and 3d were tested before and after hot roll @ 300° F. and provided in Table 9, below.

TABLE 9

Performance characteristics of sample composition 1 d, 2 d and 3 d.
Period of Aging = 16 Hours@300° F.

| | Sample Composition | | | | | |
|---|---|---|---|---|---|---|
| | 1d | | 2d | | 3d | |
| RHEOLOGY @ 49° C. | BHR | AHR | BHR | AHR | BHR | AHR |
| @600 RPM (viscometer dial reading) | 168 | 88 | 182 | 102 | 202 | 153 |
| @300 RPM (viscometer dial reading) | 124 | 58 | 136 | 74 | 150 | 110 |
| @200 RPM (viscometer dial reading) | 102 | 45 | 110 | 52 | 124 | 89 |
| @100 RPM (viscometer dial reading) | 89 | 34 | 93 | 39 | 92 | 62 |
| @6 RPM (viscometer dial reading) | 36 | 15 | 40 | 21 | 69 | 30 |
| @3 RPM (viscometer dial reading) | 25 | 12 | 32 | 18 | 53 | 24 |
| @10" (viscometer dial reading) | 41 | 15 | 37 | 23 | 60 | 27 |
| @10' (viscometer dial reading) | 46 | 18 | 51 | 26 | 73 | 35 |
| APPARENT VISCOSITY (cP) | 84 | 44 | 91 | 51 | 101 | 76.5 |
| PLASTIC VISCOSITY (cP) | 44 | 30 | 46 | 28 | 52 | 43 |
| YIELD POINT (lbs/100 ft$^2$) | 80 | 28 | 90 | 46 | 98 | 67 |
| YIELD POINT (Pascal) | 40 | 14 | 45 | 23 | 49 | 33.5 |
| Mud Weight (kg/m$^3$) | 10.5 | 10.5 | 12 | 12 | 16.5 | 16.5 |
| 50% Mud pH | 7.12 | 7.14 | 7.34 | 7.43 | 7.39 | 7.36 |
| Electrical Stability @ 49° C. | 701 | 673 | 1155 | 789 | 1662 | 578 |
| HTHP FLUID LOSS (mL) Overall 30 minutes @ 150° C. & 500 Psi differential pressure | | 3.8 | | 4 | | 3.6 |
| Filter Cake Thickness (mm) | | <1 | | <1 | | <1 |
| OWR | 70:30 | | 70:30 | | 70:30 | |

TABLE 10

Comparative compositions

| Component | | Comparative composition 1 | 2 | 3 | 4 | 5 | 6 |
|---|---|---|---|---|---|---|---|
| Petroleum Distillate | (L/m$^3$) | 568 | 733 | 532 | 684 | 419 | 537 |
| Organophilic clay | (kg/m$^3$) | 23 | 23 | 23 | 23 | 23 | 23 |
| Primary Emulsifier | (L/m$^3$) | 17 | 17 | 17 | 17 | 17 | 17 |
| Secondary Emulsifier | (L/m$^3$) | 12 | 12 | 12 | 12 | 12 | 12 |
| Lime | (kg/m$^3$) | 15 | 15 | 15 | 15 | 15 | 15 |
| Water | (L/m$^3$) | 243 | 82 | 225 | 76 | 178 | 63 |
| Calcium Chloride | (kg/m$^3$) | 85 | 29 | 78 | 26 | 62 | 22 |
| Fluid loss additive | (kg/m$^3$) | 24 | 24 | 24 | 24 | 24 | 24 |
| Barite | (kg/m$^3$) | 365 | 444 | 600 | 673 | 1297 | 1354 |
| Mud Weight | (lb$_m$/gal) | 10.5 | 10.5 | 12 | 12 | 16.5 | 16.5 |
| Oil:Water Ratio | | 70:30 | 90:10 | 70:30 | 90:10 | 70:30 | 90:10 |

Example 4—Comparative Compositions Using Organophilic Clay

Comparative compositions simulating conventional drilling muds were prepared similar to the sample compositions of Example 1 except that organophilic clay was included in these compositions. The primary emulsifier comprises a mixture of fatty acids and surfactants. The secondary emulsifier comprises a dicarboxylic acid terminated polyamide. The fluid loss additive was asphalt.

The amounts of the various components were varied in each sample composition as set out in Table 10, below.

The fluid compositions of example 4 were aged for 16 hours by hot rolling. Properties were tested before hot rolling (BHR) and after hot rolling (AHR). The hot rolling simulates the wear of the fluid composition under downhole conditions.

The performance characteristics of comparative composition 1 were tested in triplicate and provided in table 11, below.

TABLE 11

Performance characteristics of comparative composition 1
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @600 RPM (viscometer dial reading) | 64 | 72 | 52 | 61 | 58 | 69 |
| @300 RPM (viscometer dial reading) | 37 | 42 | 30 | 35 | 34 | 40 |
| @200 RPM (viscometer dial reading) | 23 | 28 | 20 | 22 | 21 | 26 |
| @100 RPM (viscometer dial reading) | 15 | 17 | 13 | 12 | 14 | 15 |
| @6 RPM (viscometer dial reading) | 4 | 6 | 3 | 4 | 4 | 5 |
| @3 RPM (viscometer dial reading) | 3 | 5 | 2 | 3 | 3 | 4 |
| @10" (viscometer dial reading) | 5 | 6 | 4 | 4 | 5 | 6 |
| @10' (viscometer dial reading) | 6 | 7 | 4 | 5 | 5 | 6 |
| APPARENT VISCOSITY (cP) | 32 | 36 | 26 | 30.5 | 29 | 34.5 |
| PLASTIC VISCOSITY (cP) | 27 | 30 | 22 | 26 | 24 | 29 |
| YIELD POINT (lbs/100 ft$^2$) | 10 | 12 | 8 | 9 | 10 | 11 |
| YIELD POINT (Pascal) | 4.8 | 5.76 | 3.84 | 4.32 | 4.8 | 5.28 |
| Mud Weight (lbs/gal) | | | 10.5 | | | |
| 50% Mud pH | 8.26 | 8.32 | 8.20 | 8.18 | 8.22 | 8.29 |
| Electrical Stability @ 49° C. | 819 | 938 | 859 | 927 | 950 | 1114 |
| HTHP FLUID LOSS (Overall 30 minutes) 500 Psi differential pressure (mL) | | 4.0 ml @ 93° C. | | 4.4 ml @ 93° C. | | 3.4 ml @ 93° C. |
| Filter Cake Thickness (mm) | | 2 mm | | 2.7 mm | | 2.4 mm |
| OWR | | | 70:30 | | | |

The performance characteristics of comparative composition 2 were tested in triplicate and provided in table 12, below.

TABLE 12

Performance characteristics of comparative composition 2
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @600 RPM (viscometer dial reading) | 52 | 58 | 43 | 48 | 39 | 50 |
| @300 RPM (viscometer dial reading) | 30 | 34 | 26 | 28 | 24 | 29 |
| @200 RPM (viscometer dial reading) | 18 | 21 | 16 | 19 | 15 | 20 |
| @100 RPM (viscometer dial reading) | 12 | 15 | 13 | 13 | 10 | 13 |
| @6 RPM (viscometer dial reading) | 4 | 5 | 4 | 4 | 3 | 4 |
| @3 RPM (viscometer dial reading) | 3 | 4 | 3 | 3 | 2 | 3 |
| @10" (viscometer dial reading) | 4 | 5 | 4 | 4 | 3 | 4 |
| @10' (viscometer dial reading) | 4 | 6 | 5 | 6 | 4 | 5 |
| APPARENT VISCOSITY (cP) | 26 | 29 | 21.5 | 24 | 19.5 | 25 |
| PLASTIC VISCOSITY (cP) | 22 | 24 | 17 | 20 | 15 | 21 |
| YIELD POINT (lbs/100 ft$^2$) | 8 | 10 | 9 | 8 | 9 | 8 |
| YIELD POINT (Pascal) | 3.84 | 4.8 | 4.32 | 3.84 | 4.32 | 3.84 |
| Mud Weight (lbs/gal) | | | 10.5 | | | |
| 50% Mud pH | 8.06 | 8.02 | 8.09 | 8.02 | 8.11 | 8.18 |
| Electrical Stability @ 49° C. | 998 | 1032 | 856 | 906 | 1023 | 1104 |
| HTHP FLUID LOSS (Overall 30 minutes) 500 Psi differential pressure (ml) | | 4 ml @ 93° C. | | 3.6 ml @ 93° C. | | 4.4 ml @ 93° C. |
| Filter Cake Thickness (mm) | | 2.6 mm | | 2.1 mm | | 2.5 mm |
| OWR | | | 90:10 | | | |

The performance characteristics of comparative composition 3 were tested in triplicate and provided in table 13, below.

TABLE 13

Performance characteristics of comparative composition 3
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @600 RPM (viscometer dial reading) | 103 | 111 | 87 | 92 | 98 | 107 |
| @300 RPM (viscometer dial reading) | 60 | 65 | 50 | 54 | 58 | 63 |

TABLE 13-continued

Performance characteristics of comparative composition 3
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @200 RPM (viscometer dial reading) | 37 | 40 | 30 | 32 | 35 | 38 |
| @100 RPM (viscometer dial reading) | 25 | 26 | 18 | 19 | 23 | 25 |
| @6 RPM (viscometer dial reading) | 7 | 8 | 5 | 6 | 6 | 6 |
| @3 RPM (viscometer dial reading) | 5 | 6 | 4 | 4 | 5 | 5 |
| @10" (viscometer dial reading) | 8 | 8 | 5 | 5 | 7 | 8 |
| @10' (viscometer dial reading) | 9 | 10 | 6 | 7 | 8 | 9 |
| APPARENT VISCOSITY (cP) | 51.5 | 55.5 | 43.5 | 46 | 49 | 53.5 |
| PLASTIC VISCOSITY (cP) | 43 | 46 | 37 | 38 | 40 | 44 |
| YIELD POINT (lbs/100 ft$^2$) | 17 | 19 | 13 | 16 | 18 | 19 |
| YIELD POINT (Pascal) | 8.16 | 9.12 | 6.24 | 7.68 | 8.64 | 9.12 |
| Mud Weight (lbs/gal) | 12 | | | | | |
| 50% Mud pH | 8.35 | 8.41 | 8.28 | 8.24 | 8.31 | 8.33 |
| Electrical Stability @ 49° C. | 1008 | 1022 | 789 | 916 | 1079 | 1121 |
| HTHP FLUID LOSS (Overall 30 minutes) 500 Psi differential pressure (ml) | | 2.8 ml @ 93° C. | | 3.2 ml @ 93° C. | | 2.6 ml @ 93° C. |
| Filter Cake Thickness (mm) | | 2.5 mm | | 2.7 mm | | 2.4 mm |
| OWR | 70:30 | | | | | |

The performance characteristics of comparative composition 4 were tested in triplicate and provided in table 14, below.

TABLE 14

Performance characteristics of comparative composition 4
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @800 RPM (viscometer dial reading) | 70 | 83 | 66 | 72 | 75 | 80 |
| @300 RPM (viscometer dial reading) | 41 | 47 | 38 | 41 | 43 | 46 |
| @200 RPM (viscometer dial reading) | 27 | 31 | 25 | 27 | 28 | 30 |
| @100 RPM (viscometer dial reading) | 19 | 22 | 17 | 18 | 19 | 21 |
| @6 RPM (viscometer dial reading) | 5 | 6 | 5 | 5 | 5 | 6 |
| @3 RPM (viscometer dial reading) | 4 | 5 | 4 | 4 | 4 | 5 |
| @10" (viscometer dial reading) | 5 | 6 | 5 | 6 | 6 | 6 |
| @10' (viscometer dial reading) | 6 | 9 | 5 | 7 | 7 | 8 |
| APPARENT VISCOSITY (cP) | 35 | 41.5 | 33 | 36 | 37.5 | 40 |
| PLASTIC VISCOSITY (cP) | 29 | 36 | 28 | 31 | 32 | 34 |
| YIELD POINT (lbs/100 ft$^2$) | 12 | 11 | 10 | 10 | 11 | 12 |
| YIELD POINT (Pascal) | 5.76 | 5.28 | 4.8 | 4.8 | 5.28 | 5.76 |
| Mud Weight (lbs/gal) | 12 | | | | | |
| 50% Mud pH | 8.18 | 8.22 | 8.15 | 8.10 | 8.21 | 8.19 |
| Electrical Stability @ 49° C. | 1033 | 1105 | 923 | 986 | 759 | 844 |
| HTHP FLUID LOSS (Overall 30 minutes) 500 Psi differential pressure (ml) | | 2.2 ml @ 93° C. | | 2.8 ml @ 93° C. | | 2.2 ml @ 93° C. |
| Filter Cake Thickness (mm) | | 2.5 mm | | 2.2 mm | | 3 mm |
| OWR | 90:10 | | | | | |

The performance characteristics of comparative composition 5 were tested in triplicate and provided in table 15, below.

TABLE 15

Performance characteristics of comparative composition 5
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @600 RPM (viscometer dial reading) | 101 | 110 | 131 | 140 | 128 | 135 |
| @300 RPM (viscometer dial reading) | 58 | 64 | 75 | 83 | 74 | 79 |

TABLE 15-continued

Performance characteristics of comparative composition 5
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @200 RPM (viscometer dial reading) | 39 | 42 | 48 | 52 | 47 | 49 |
| @100 RPM (viscometer dial reading) | 24 | 25 | 33 | 37 | 32 | 34 |
| @6 RPM (viscometer dial reading) | 7 | 7 | 8 | 9 | 9 | 8 |
| @3 RPM (viscometer dial reading) | 6 | 5 | 7 | 8 | 7 | 7 |
| @10" (viscometer dial reading) | 7 | 6 | 9 | 9 | 11 | 8 |
| @10' (viscometer dial reading) | 9 | 8 | 10 | 10 | 12 | 9 |
| APPARENT VISCOSITY (cP) | 50.5 | 55 | 65.5 | 70 | 64 | 67.5 |
| PLASTIC VISCOSITY (cP) | 43 | 46 | 56 | 57 | 54 | 56 |
| YIELD POINT (lbs/100 ft$^2$) | 15 | 18 | 19 | 26 | 20 | 23 |
| YIELD POINT (Pascal) | 7.2 | 8.64 | 9.12 | 12.48 | 9.6 | 11.04 |
| Mud Weight (lbs/gal) | | | 16.5 | | | |
| 50% Mud pH | 8.26 | 8.32 | 8.22 | 8.28 | 8.19 | 8.25 |
| Electrical Stability @ 49° C. | 996 | 1056 | 1123 | 1205 | 1321 | 1405 |
| HTHF FLUID LOSS (Overall 30 minutes) 500 Psi differential pressure (ml) | | 3.0 ml @ 93° C. | | 20 ml @ 93° C. | | 2.2 ml @ 93° C. |
| Filter Cake Thickness (mm) | | 2.9 mm | | 2.5 mm | | 2.7 mm |
| OWR | | | 70:30 | | | |

The performance characteristics of comparative composition 6 were tested in triplicate and provided in table 15, below.

TABLE 16

Performance characteristics of comparative composition 6
Period of Aging = 16 Hours

| RHEOLOGY @ 49° C. | BHR Test 1 | AHR Test 1 | BHR Test 2 | AHR Test 2 | BHR Test 3 | AHR Test 3 |
|---|---|---|---|---|---|---|
| @600 RPM (viscometer dial reading) | 110 | 121 | 107 | 112 | 99 | 116 |
| @300 RPM (viscometer dial reading) | 60 | 67 | 59 | 63 | 56 | 65 |
| @200 RPM (viscometer dial reading) | 36 | 40 | 35 | 37 | 34 | 39 |
| @100 RPM (viscometer dial reading) | 23 | 26 | 23 | 24 | 22 | 25 |
| @6 RPM (viscometer dial reading) | 7 | 7 | 7 | 7 | 5 | 7 |
| @3 RPM (viscometer dial reading) | 6 | 6 | 6 | 6 | 4 | 6 |
| @10" (viscometer dial reading) | 6 | 8 | 7 | 7 | 6 | 7 |
| @10' (viscometer dial reading) | 8 | 10 | 8 | 9 | 8 | 9 |
| APPARENT VISCOSITY (cP) | 55 | 60.5 | 53.5 | 56 | 49.5 | 58 |
| PLASTIC VISCOSITY (cP) | 50 | 54 | 48 | 49 | 43 | 51 |
| YIELD POINT (lbs/100 ft$^2$) | 10 | 13 | 11 | 14 | 13 | 14 |
| YIELD POINT (Pascal) | 4.8 | 6.24 | 5.28 | 6.72 | 6.24 | 6.72 |
| Mud Weight (lbs/gal) | | | 16.5 | | | |
| 50% Mud pH | 8.08 | 8.11 | 8.04 | 8.09 | 7.98 | 7.95 |
| Electrical Stability @ 49° C. | 1099 | 1135 | 1015 | 1095 | 981 | 1036 |
| HTHP FLUID LOSS (Overall 30 minutes) 500 Psi differential pressure (ml) | | 2.8 ml @ 93° C. | | 2.4 ml @ 93° C. | | 2.6 ml @ 93° C. |
| Filter Cake Thickness (mm) | | 2.9 mm | | 3.1 mm | | 2.7 mm |
| OWR | | | 90:10 | | | |

The invention claimed is:

1. A fluid composition comprising:
   a base fluid; and
   an additive composition comprising:
      an emulsifier;
      a fluid loss control agent;
      a rheology modifier; and
      a viscosifier;
   wherein the fluid composition is free or substantially free of organophilic clay;
   wherein the Theology modifier has a dicarboxylic acid group; and
   wherein the additive composition forms a gel, and
   wherein the viscosifier and the rheology modifier form cross-links to provide structure for the gel.

2. The fluid composition of claim 1, wherein the base fluid is an oleic material.

3. The fluid composition of claim 2, wherein the oleic material comprises a synthetic oil, semi-synthetic oil, petroleum distillate or a combination thereof.

4. The fluid composition of claim 2, wherein the oleic material comprises a paraffinic material, an olefinic material, an ester material, a polycyclic aromatic hydrocarbon material, or a combination thereof.

5. The fluid composition of claim 1, wherein the emulsifier comprises a dicarboxylic acid terminated polyamide.

6. The fluid composition of claim 1, wherein the viscosifier comprises a saturated fatty acid derivative.

7. The fluid composition of claim 1, wherein the fluid loss control agent comprises a modified fatty acid.

8. The fluid composition of claim 7, wherein the modified fatty acid is a fatty acid anhydride.

9. The fluid composition of claim 1 further comprising an aqueous phase.

10. The fluid composition of claim 9, wherein the aqueous phase comprises sodium chloride, calcium chloride, or a combination thereof.

11. The fluid composition of claim 1 further comprising a thinning agent, a pH modifier, a weighting agent, or any combination thereof.

12. The fluid composition of claim 1, wherein a yield point to plastic viscosity ratio is less than about 0.5.

13. The fluid composition of claim 1, wherein the fluid composition comprises:
   from about 400 L to about 800 L of the base fluid per cubic meter of the fluid composition from about 21 to about 45 L of the emulsifier per cubic meter of the fluid composition;
   from about 8 to about 26 kg of the viscosifier per cubic meter of the fluid composition;
   from about 3 L to about 15 L of the rheology modifier per cubic meter of the fluid composition;
   from about 50 to about 300 L of water per cubic meter of the fluid composition;
   and from 0 to about 30 wt % of a salt based on the weight of the water.

14. The fluid composition of claim 13, wherein the fluid composition further comprises from about 300 to about 1400 kg of barite per cubic meter of the fluid composition.

15. The fluid composition of claim 13, wherein the fluid composition further comprises from about 10 to about 30 kg of lime per cubic meter of the fluid composition.

16. The fluid composition of claim 11, wherein the pH modifier is lime; and the lime reacts with the emulsifier.

17. The fluid composition of claim 16, wherein the lime undergoes a saponification reaction with the emulsifier forming an oil soluble soap.

18. The fluid composition of claim 1, wherein the fluid loss control agent is a secondary emulsifier.

19. The fluid composition of claim 7, wherein the modified fatty acid is derived from a fatty acid treated with a dicarboxylic acid.

20. The fluid composition of claim 1, wherein the rheology modifier is:

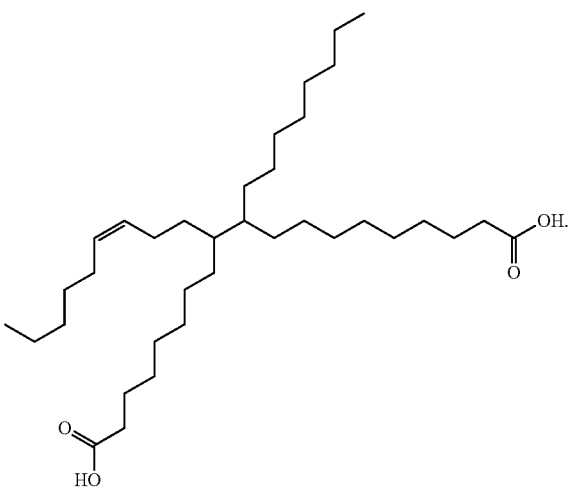 [SMILES: CCCCC/C=C\CCC(CCCCCCCC(=O)O)C(CCCCCCCC)CCCCCCCCC(=O)O]

* * * * *